No. 735,042. PATENTED JULY 28, 1903.
W. SPERRY.
FANNING MILL.
APPLICATION FILED SEPT. 15, 1900.
NO MODEL. 2 SHEETS—SHEET 1.

WITNESSES

INVENTOR
WILLIS SPERRY
BY Paul Hawley
HIS ATTORNEYS

No. 735,042. PATENTED JULY 28, 1903.
W. SPERRY.
FANNING MILL.
APPLICATION FILED SEPT. 15, 1900.
NO MODEL. 2 SHEETS—SHEET 2.

WITNESSES.
E. G. Stener
M. C. Gooley

INVENTOR
WILLIS SPERRY
BY Paul & Hawley
HIS ATTORNEYS

No. 735,042.

Patented July 28, 1903.

UNITED STATES PATENT OFFICE.

WILLIS SPERRY, OF OWATONNA, MINNESOTA, ASSIGNOR TO SPERRY MANUFACTURING CO., OF OWATONNA, MINNESOTA, A CORPORATION OF MINNESOTA.

FANNING-MILL.

SPECIFICATION forming part of Letters Patent No. 735,042, dated July 28, 1903.

Application filed September 15, 1900. Serial No. 30,115. (No model.)

*To all whom it may concern:*

Be it known that I, WILLIS SPERRY, of Owatonna, in the county of Steele and State of Minnesota, have invented certain new and useful Improvements in Fanning-Mills, of which the following is a specification.

This invention relates to improvements in fanning-mills for separating grain, and particularly to improvements in fanning-mills employing two shoes each containing one or more sieves.

The objects of my present invention are to provide a fanning-mill having two vibratory shoes, both arranged to vibrate laterally or having what is termed a "side shake," both of said shoes being supported and operated so as to balance each other; also, to provide a mill that is adapted for cleaning flax, wheat, timothy, clover seed, and, in fact, any kind of seed or grain and that may be used with equal advantage for separating wheat from oats and cleaning both the wheat and the oats.

Other objects of the invention will appear from the following detailed description, taken in connection with the accompanying drawings, in which—

Figure 1:
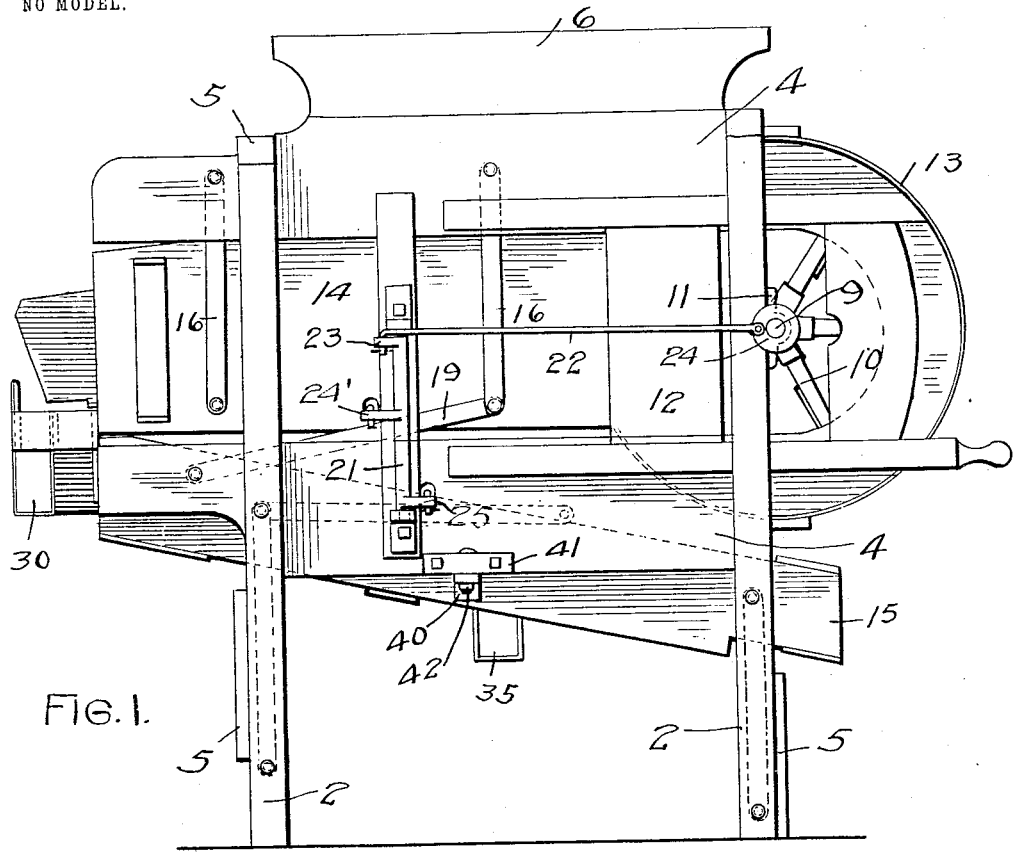
Figure 2:
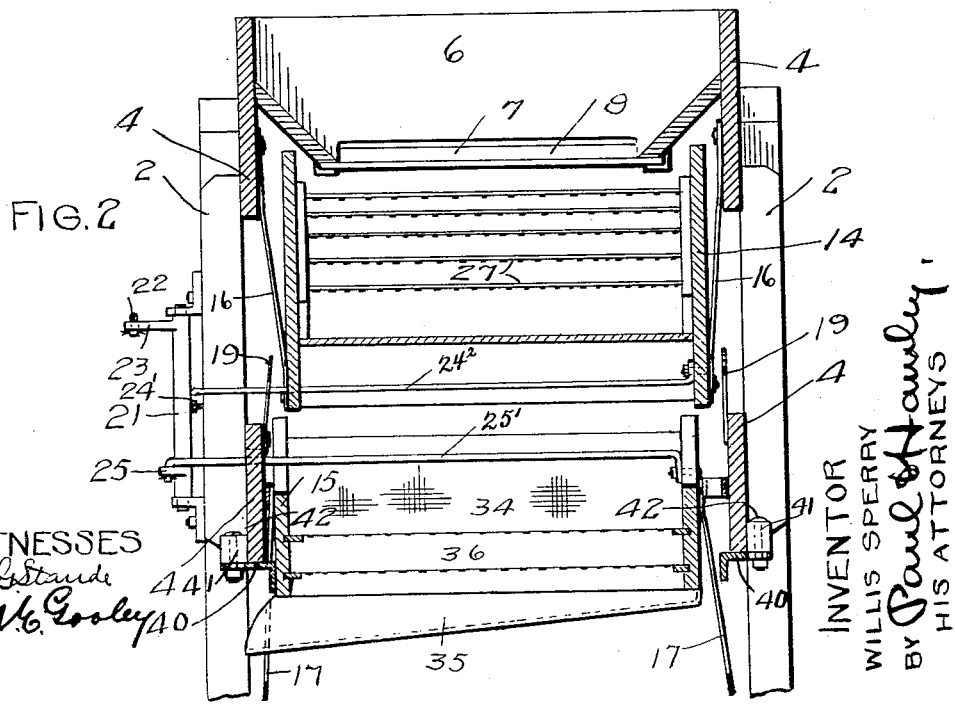
Figure 3:
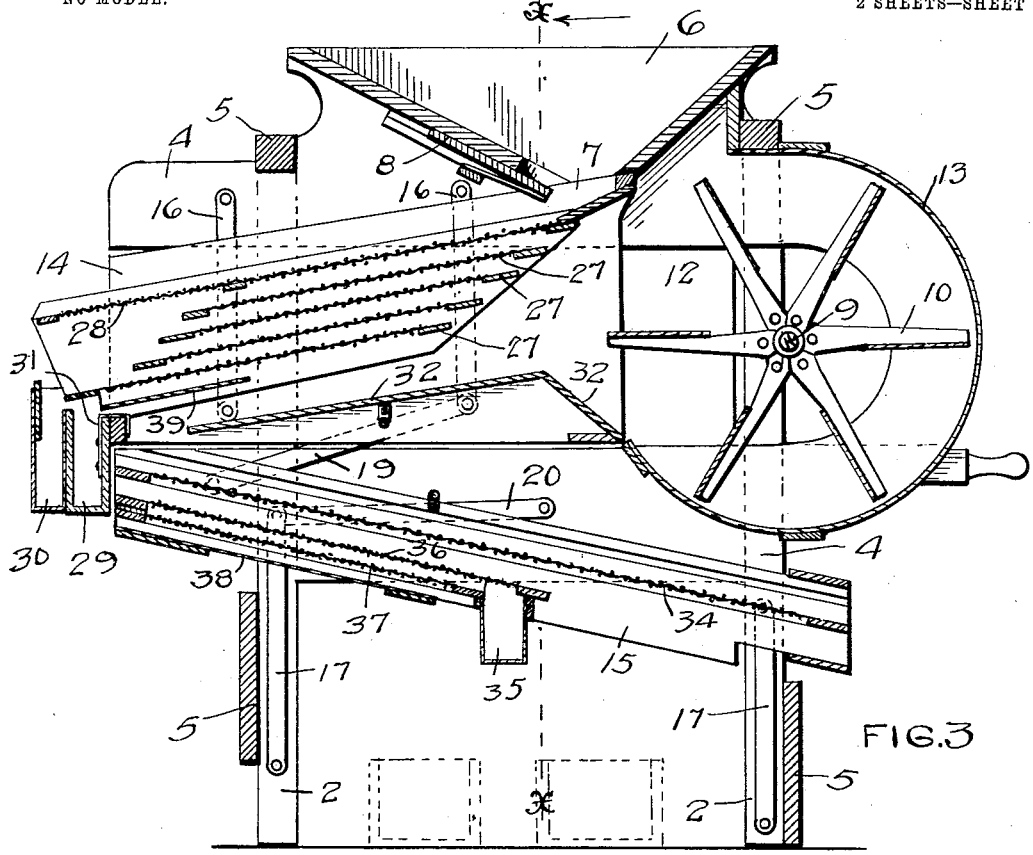
Figure 4:
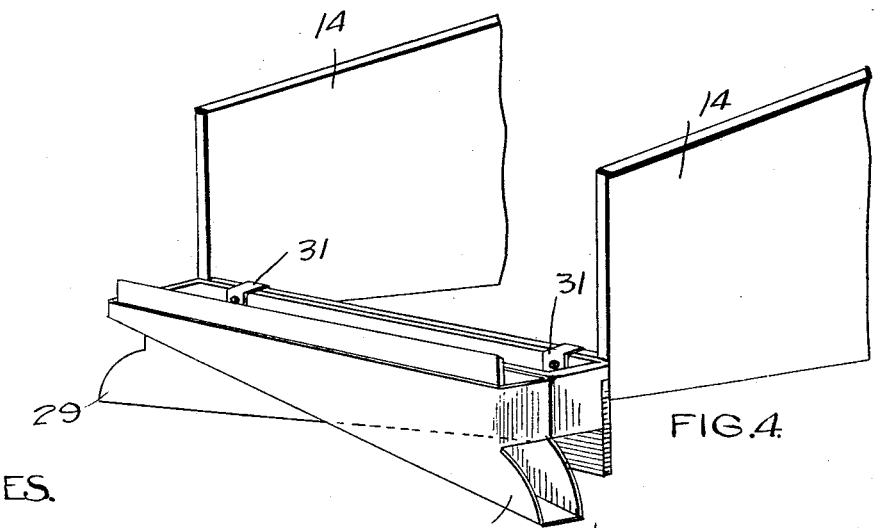

Figure 1 is a side elevation of a fanning-mill embodying my invention. Fig. 2 is a transverse section on line $xx$ of Fig. 3. Fig. 3 is a longitudinal vertical section. Fig. 4 is a detail.

As shown in the drawings, the frame of the machine is made up of the legs 2, connected by the side boards 4 and the various cross boards or bars 5. The grain-hopper 6 is arranged in the top of the frame. The hopper is provided with a discharge-opening 7 in its bottom, which may be regulated from the bottom of the hopper by the slide 8.

9 is the shaft of the fan 10. This shaft is provided with bearings 11, arranged, preferably, upon the rear legs 2 of the machine. This shaft is driven by a suitable crank and gears (not shown) arranged at one end of the shaft.

13 is the fan-casing, having openings in its ends, which openings may be regulated by means of the usual slides 12.

14 and 15 are the two sieve-shoes of the machine. These may be of any desired shape or outline suitable to the particular assortment of screens or sieves to be used. Each of these shoes is supported so as to be capable of a side shake, and they are arranged to move in opposite directions, so as to balance each other, and thus prevent shaking or jarring of the mill. The upper shoe 14 is mounted upon the lower ends of the spring-hangers 16, and the lower shoe 15 is supported upon the upper ends of the spring-hangers 17. By having the upper shoe mounted upon the lower ends of the hangers and the lower shoe supported upon the upper ends of its hangers various advantages are gained, among which may be mentioned that the space between the two shoes may be left open, so as to permit access to the interior of the mill. The two shoes may be brought close together. Long hangers may be employed for both shoes, so that the end of each hanger will swing in an arc having a long radius, and the shoes may be of different lengths without the movement of the one interfering with the movement of the other. These are important advantages and are among some of the advantages resulting from the manner of suspending the two shoes in relation to each other. The upper shoe 14 is kept from having any longitudinal vibration by means of the link or spring-plate 19, which has one end connected to the shoe and the other end connected to the frame of the machine. This link is arranged in a substantially horizontal position, and this link while permitting the shoe to swing freely laterally prevents any longitudinal movement. A similar link 20 is connected to the lower shoe 15 and also to the frame of the machine, and this link while permitting the lower shoe to vibrate laterally freely prevents any longitudinal movement thereof. A vertical shaft or post 21 is mounted in suitable bearings arranged on the side of the frame of the machine. A connecting-rod 22 is connected with a short arm or crank 23 on this shaft, and the opposite end of the rod is connected to a crank-disk 24 on the fan-shaft 9. By this means as the fan-shaft is rotated the vertical shaft 21 is given an oscillating movement. This shaft is also provided with the short arms 24' and 25, which extend in opposite directions from the shaft 21. One of said arms is connected to the far side of shoe 14 by the rod 24² and the other to the far side of shoe 15 by the rod 25'. By this means the shoes are laterally reciprocated, and as one shoe is moving in one direction the other shoe is moving in the opposite direction, and thereby the shoes balance each other and any shaking of the mill is prevented. The upper shoe is provided with a gang of sieves 27, and the upper sieve of the gang is provided with an extension 28 for the purpose hereinafter stated. Double reversely-inclined spouts 29 and 30 are arranged at the foot of the shoe 14, the spout 29 being adapted to receive the grain and material that pass through the lower portion of the sieves 27. The material that passes over the tails of the sieves 27 will be conducted into the spout 30, while the straw, chaff, and refuse material will be carried over both of the spouts 29 and 30 by means of the extension 28. The spouts 29 and 30 are preferably secured together, and they are removably secured to the shoe 14 by means of the hooks 31. When it is desired in shipping the mill or for other purposes to remove the spouts 29 and 30, they may be lifted off from the shoe by simply disengaging the hooks 31 from their supports. The lower portion of the shoe 14 is provided with the transverse board or plates 32, which form a continuation of the lower wall of the fan-casing and form also an inclined bottom for the shoe. The grain and material that falls upon the forward inclined plate or board 32 passes over said plate and falls upon the screens of the lower shoe. This lower shoe may be provided with any desired number of screens or sieves. The upper screen 34 preferably extends the full length of the shoe and is so constructed that it may be removed and a screen of coarser or finer mesh substituted therefor. More than one of the screens 34 may, if preferred, be employed. The shoe 15 is also preferably provided with a transverse spout 35, arranged, preferably, at a point about midway of its length. A screen 36 will preferably be arranged below the screen 34 and extending over the spout 35, and another screen 37 will preferably be arranged below the screen 36 and so as to discharge its tailings into the spout 35. A board or plate 38 is preferably arranged beneath the screen 37 and discharging it into a suitable receptacle. Suitable receptacles may be placed on the floor below the shoe 15 to receive the material that passes over the screen 36 and that which passes through the screen 37. I also prefer to provide a board or plate 39, arranged in the lower part of the shoe 14 beneath the lower portion of the sieves 27. This board will cause the material passing through the lower portion of the screens 27 to be discharged into the spout 29. When this board is not used, this material will mainly fall upon the upper screen of the lower shoe. This board, for the reason hereinafter stated, I call the "repeat-board."

The wind from the fan prevents the clogging of the sieves or screens of the upper shoe; but as the lower shoe is cut off from the currents of air some difficulty is usually experienced in keeping the screen of this shoe clear. It is necessary, in consequence, to provide some way of automatically jarring the lower shoe to vibrate the grain upon the surface of the sieve and prevent the lodgment of grain and fine particles of material in the meshes of the sieves. For this purpose I provide stops or bumpers 40, that are arranged upon the frame of the machine at each side of the lower shoe and at a point near the longitudinal center thereof. As here shown, a block 41 is secured to the frame of the machine, and the bumper 40 consists of a piece of angle-iron that is connected to the block 41 by means of a suitable bolt 42. The bumpers 40 may be adjusted toward or from the shoe, and thereby the force with which the shoe will encounter each bumper and the jar or shock that will be given to the shoe and screens carried thereby may be regulated. As these bumpers are arranged at substantially the longitudinal center of the lower shoe, the shock or jar to the shoe will be uniform over its entire surface, and consequently over all parts of the screens carried thereby.

The operation of this machine is as follows: The grain to be cleaned is fed into the hopper and passes out through the opening in the bottom thereof and falls upon the upper portion of the sieves in the shoe 14. The straw and chaff will be taken out by the extension of the upper sieve of the gang and carried over the spout 30 and dropped upon the floor, the blast of air passing through this gang of sieves aiding in carrying the straw and light material over the surface of the upper sieve. In the separation of succotash—that is, mixed oats and wheat—the oats will pass over the tails of the sieves 27 and be discharged into the spout 30. The clean wheat, together with the small fine seeds, will pass through the upper portions of the sieves 27 upon the board 32 and will be thence conducted to the sieves of the lower shoe. The mixed wheat and oats passing through the lower parts of the sieves 27 will be discharged into the repeat-spout 29, and this material will preferably be returned to the hopper to be again passed through the mill. Any small seeds that may go through the upper gang of sieves with the wheat will be taken out by the sieves or screens of the lower shoe and the clean wheat will be discharged at the lower end of the shoe 15. By suitable adjustment of the screens or sieves the machine may be used for cleaning wheat, oats, flax, clover, timothy, or other grain or seed. In separating timothy from clover the clover-seed will pass over the sieve 36, a sieve of suitable mesh being employed, and the timothy-seed and other material finer than the clover-seed will pass through the sieve 34 and fall upon the sieve 36. The timothy-seed will pass through the sieve 36 and over the tail of the sieve 37 into the spout 35. The material coarser than the timothy-seed will be carried over the tail of the sieve 36 and be conducted by the board 38 to a suitable receptacle arranged below said board. All of the sieves are made removable, so that sieves of different mesh may be employed for the different kinds of grain or seed that is being operated upon. By constructing the spouts 29 and 30 so that they may be readily removed access is had to the lower shoe, so as to permit the sieves or screens to be readily removed therefrom.

Modifications of the construction in various particulars may be made, and hence I do not confine myself to the details of the construction herein shown and described.

I claim as my invention—

1. In a fanning-mill, the combination with the frame, of the upper shoe 14, and lower shoe 15, links or hangers 16 having their upper ends secured to the frame of the machine and their lower ends to the upper shoe, links or hangers 17 having their lower ends secured to the frame of the machine and their upper ends to the lower shoe, and means for laterally reciprocating said shoes in opposite directions, said means consisting of a rotatable vertical shaft at one side of the frame, having oppositely-extending arms, and rods connecting said arms with the far sides of the shoes at the part of the respective shoes to which the ends of the hangers are connected, substantially as described.

2. In a fanning-mill, the combination, with the laterally-reciprocating shoe 15 and means for reciprocating said shoe, of the adjustable bumpers 40 secured upon the frame of the machine at substantially the longitudinal centers of said shoe, said bumpers consisting of blocks 41 secured to the frame of the machine, angle-irons, and bolts securing the angle-irons to the blocks 41, for the purpose set forth.

In testimony whereof I have hereunto set my hand, this 1st day of September, 1900, at Owatonna, Minnesota.

WILLIS SPERRY.

In presence of—
G. B. BENNETT,
R. J. HOLMES.